United States Patent
Vollmer et al.

[11] Patent Number: 5,755,536
[45] Date of Patent: May 26, 1998

[54] INDEXABLE CUTTING INSERT

[75] Inventors: Rolf Vollmer; Horst Stihler, both of Tübingen; Siegfried Bohnet, Mössingen, all of Germany

[73] Assignee: Walter AG, Tubingen, Germany

[21] Appl. No.: 564,329

[22] PCT Filed: Jun. 4, 1994

[86] PCT No.: PCT/DE94/00624

§ 371 Date: Dec. 11, 1995

§ 102(e) Date: Dec. 11, 1995

[87] PCT Pub. No.: WO94/29055

PCT Pub. Date: Dec. 22, 1994

[30] Foreign Application Priority Data

Jun. 12, 1993 [DE] Germany ............ 43 19 505.9

[51] Int. Cl.$^6$ .................................... B23B 27/22
[52] U.S. Cl. ............................. 407/113; 407/114
[58] Field of Search ................... 407/113, 114, 407/117

[56] References Cited

U.S. PATENT DOCUMENTS

| 4,588,332 | 5/1986 | Komanduri | 407/114 |
| 4,627,317 | 12/1986 | Komanduri | 407/119 |

FOREIGN PATENT DOCUMENTS

| A 0 084 223 | 7/1983 | European Pat. Off. . |
| 0 160 278 A2 | 6/1985 | European Pat. Off. . |
| 0 416 901 A2 | 3/1991 | European Pat. Off. . |
| A 0458 003 | 11/1991 | European Pat. Off. . |
| C 877 531 | 9/1952 | Germany . |
| 456564 | 10/1988 | Sweden . |
| 94/16848 | 8/1994 | WIPO . |

OTHER PUBLICATIONS

M. Barash, "Production Technology Abroad", Manufacturing Engineering, Mar. 1980, p. 53.
Brochure "Turning Tools" from SANDVIK Coromant, 1984, p. 32.
"Schneidplatten—Sims wahrt Schueidfähigkeit", Werkstatt und Betrieb 118 (1985) 4, p. 188.
Brochure "ISCARMILL HELIMILL" from ISCAR, Oct. 1991.
Drawing No. 6388842/1 of PLANSEE—TIZIT, Jun. 1992.
Drawing No. RW 282400002 of KOMET, Feb. 1987.
Werkstattblatt 516 (Gruppe E), by Carl Hanser Verlag, Munchen, 1970.
Transactions of the American Society of Mechanical Engi-. neers, Bd. 107, Nr. 2, May 1985, New York (p. 100)— Komanduri & Lee "The Ledge Tool: A New Cutting Tool INsert".

*Primary Examiner*—Daniel W. Howell
*Attorney, Agent, or Firm*—Frishauf, Holtz, Goodman, Langer & Chick, P.C.

[57] ABSTRACT

In a cutting insert, cutting edge (9) is formed by the junction of a chip face (21, 22) and a flank (15). The flank is an extension of a straight portion (11) of a side face (5, 6) which begins at the base (2). Rather than remaining straight throughout the side face, straight portion (11) leads into a transitional face (13) used to form a strip (17), the face of which is the flank (15). Thus, the flank (15) is raised relative to an imaginary lengthening of the side face portion (11).

27 Claims, 5 Drawing Sheets

INDEXABLE CUTTING INSERT

BACKGROUND OF THE INVENTION

The cutting edge on indexable cutting inserts, which are used in rotary cutters or milling tools, is subject to a number of different types of wear. One type of wear is that material is gradually removed from the flank, beginning at the cutting edge, and over the course of time this wear mark, which thus becomes visible, progresses farther and farther over the flank. In the region of the flank wear, the clearance angle is negative, and therefore as the flank wear progresses the required cutting and feeding force increases. As soon as the wear mark has attained a certain extent, which is approximately 0.3 to 0.5 mm measured from the cutting edge, the indexable cutting insert is considered to be worn and is placed with a new one.

The distance covered by the tool in engagement with a workpiece until the end of the life of the cutting edge is conventionally called the wear distance. Under otherwise identical material conditions, the wear distance could in principle be improved by enlarging the cutting wedge angle, because in that way the cutting edge contains more material and lasts correspondingly longer under the wear limit is reached. However, an enlarged cutting wedge angle is achieved at the cost of the clearance angle and/or flank angle so that the cutting forces and/or feed force rises. Both of these are undesired, and therefore the cutter geometry is always a compromise between the cutting and feed forces on the one hand and the wear distance on the other.

European Patent Disclosure EP-A 0 416 901 discloses an indexable cutting insert which has a flat base, a flat top spaced apart from the base, and a side wall arrangement extending between the base and the top. The side wall arrangement is divided by a sharply bent edge, which extends at an acute angle to the cutting edge, into two flat portions that are at different angles from the top. The sharply bent edge merges into the cutting edge, so that when an indexable cutting insert is installed in a basic milling body, the clearance angle at the leading end is formed by the portion located above the sharply bent edge. The clearance angle at the trailing end is created by the second portion. In this way, even if there is a positive axial angle, the clearance angle is intended to be kept substantially identical along the cutting edge. There is no intent of attaining a lengthening of the service life by means of this geometry.

An undercut disk miller of natural steel is known from "Werkstattblatt 516", Carl Hanser Verlag, Munich, 1970. The form of each tooth of the disk miller has a recessed second flank, so that the miller is sufficiently free opposite the pitch circle, which makes regrinding of the teeth easier. The width of the first flank directly adjoining the cutting edge is substantially larger than the wear limit, because otherwise the regrinding described in this reference would not be possible.

For soldered-in cutting inserts, German Patent 877 531 also discloses forming a projection by grinding, so that the flank protrudes from a region of the hard-metal cutting insert located below the flank. In this case, however, the clearance angle and the angle that the region located below the flank forms with the vertical are of equal size. The lug is intended to protrude 0.4 mm or more.

SUMMARY OF THE INVENTION

Based on this prior art, it is the object of the invention to create a cutting insert that has a longer wear distance with an otherwise identical geometry of the cutting edge.

In the new cutting insert, the entire region of the side wall arrangement adjoining the cutting edge no longer forms the flank; instead, only that part located between the cutting edge and the setback provided in the side wall arrangement does so.

As a result of this provision, it is attained that the flank wear, measured in the direction at right angles to the cutting edge, is limited to the region between the cutting edge and the setback. The feeding force, compared with a cutting insert lacking the setback, thus remains within certain maximum limits over substantially a longer wear distance because the material of the strip defined by the setback is worn away first, and the material of the kind that is possible or present in the wear of a normal cutting insert lacking the set back is still then available. It will be readily apparent that the lengthening of the wear path can be varied within wide limits by the choice of the depth of the setback, and with increasing depth of the setback the cutting edge loses stability because of the more pronounced overhang. However, particularly in smoothing, where work is done with low cutting forces, a greater overhang is easily possible, compared with roughing operations, which because of the large chip thickness give rise to major cutting forces at right angles to the cutting edge.

Depending on the field of application of the cutting insert, the setback can extend approximately parallel to the cutting edge, or the width of the strip defined by the setback can vary along the cutting edge.

Especially if the cutting insert comprises a hard material, it is favorable if the transitional region between the flank and the region of the side wall arrangement adjacent to the setback and leading to the back side is beveled, so that sharp-edges transitions that tend to chip off are largely avoided.

Since it is desirable, in cutting inserts in which material wears off simultaneously from a plurality of cutting edges extending at angles to one another, for all the cutting edges to be worn approximately simultaneously or in other words to have the same wear distance, it can be expedient for this setback that defines the strip to be extended largely along the entire circumference of the cutting insert, which in that case can be an indexable cutting insert. However, it may also be expedient to provide this setback only for some cutting edges among all the cutting edges embodied on the cutting insert, if this proves to be advantageous, for instance for reasons of how the cutting insert is secured in the base body of the tool.

When so-called round and hence frustoconical cutting inserts are used as well, the novel embodiment of the side wall arrangement offers considerable advantages.

Naturally, in the novel embodiment of the side wall arrangement with a setback, all the clearance angles that are usual in cutting inserts, depending on the cutting insert geometry, are possible; that is, referred to the cutting insert, the clearance angle may be 0°, which results in a neutral cutting insert, or may be positive or in other words larger than 0°. In principle it is even conceivable in the novel cutting insert to provide a flank with a negative clearance angle; thus in the cutting insert, the feeding forces are virtually constant over the entire wear distance, rather than being markedly lower in a portion located where use begins than in later operation.

It is equally readily possible, in the novel cutting insert, for the clearance angle of the flank to be varied continuously or discontinuously along the cutting edge, or in other words the side wall arrangement.

BRIEF DESCRIPTION OF THE DRAWINGS

In the drawing, one exemplary embodiment of the subject of the invention is shown. Shown are.

DETAILED DESCRIPTION OF THE PREFERRED EMBODIMENT

Figure 1:
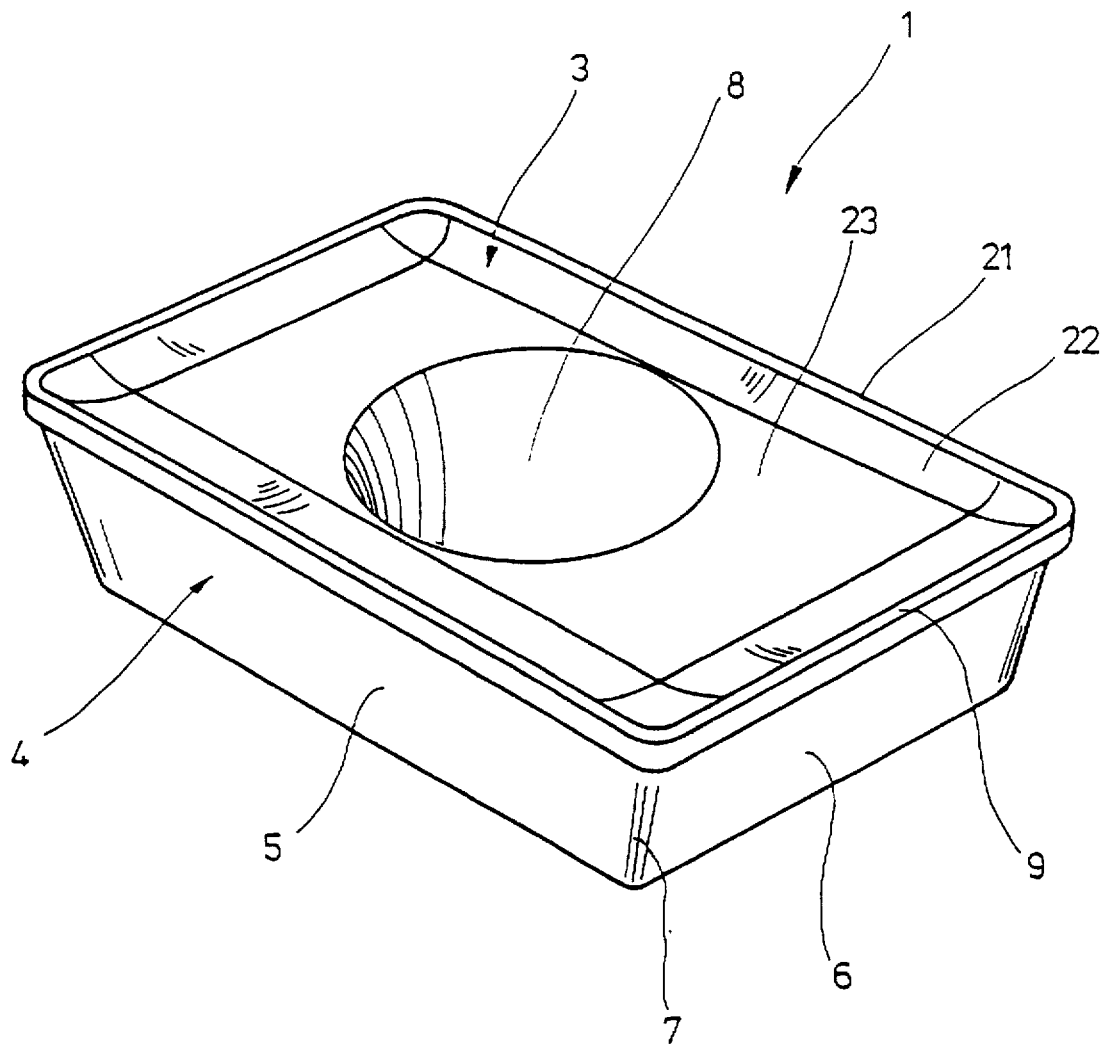
FIG. 1, an indexable cutting insert in a perspective view
Figure 2:
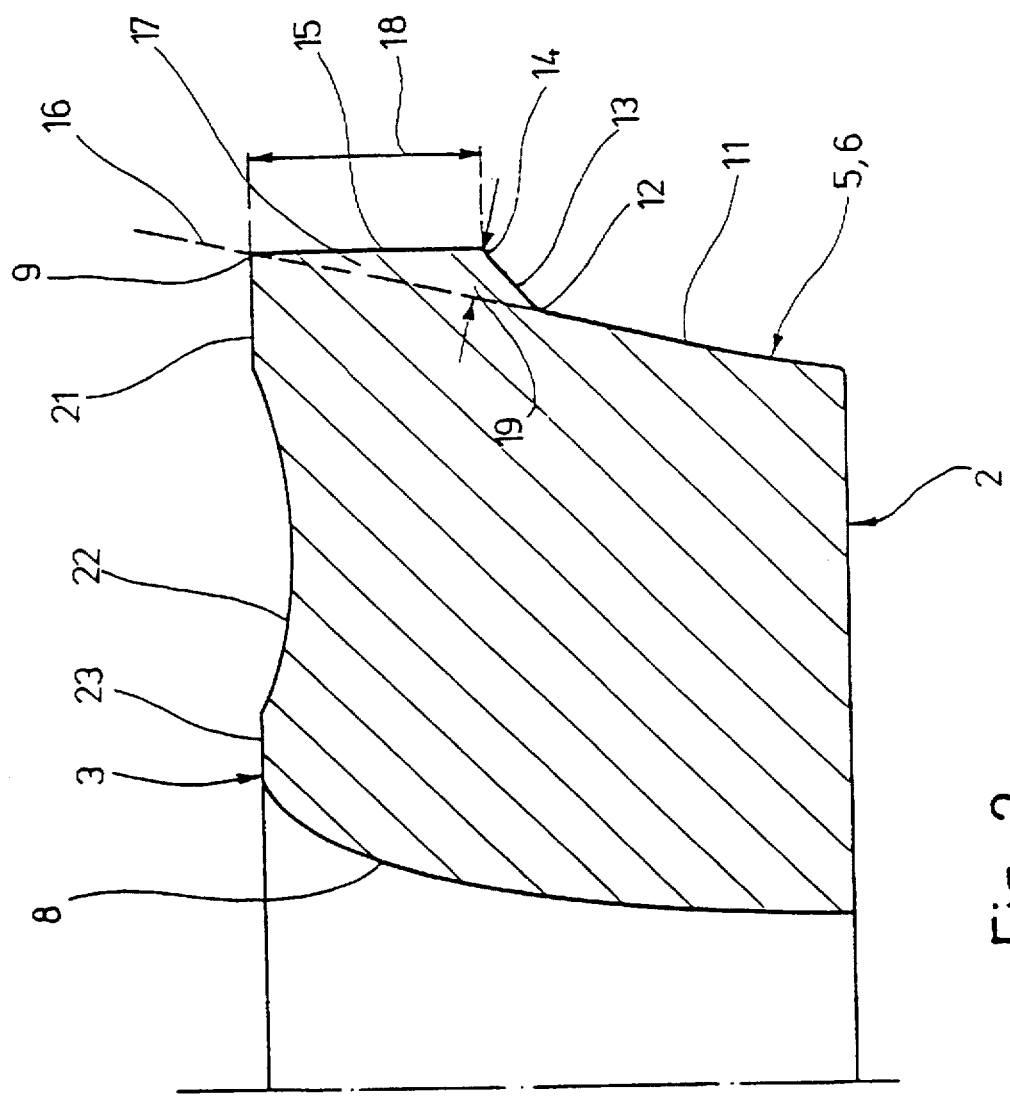
FIG. 2, a section taken through the indexable cutting insert of FIG. 1.

FIGS. 1 and 2 show a quadrilateral indexable cutting insert 1 approximately in the shape of a truncated pyramid. The indexable cutting insert 1 has a flat base 2 and a top 3 spaced apart from it. Extending between the base 2 and the top 3 is a side wall arrangement 4, which is composed of a total of four paired side faces 5, 6 parallel to one another. Because of the paired arrangement, there is a side face that is correspondingly point-symmetrical to the long side face 5 and facing away from the observer of FIG. 1, and another counterpart to side 6. The side faces 5, 6 abut one another at rounded corners.

A fastening opening 8 extends centrally through the indexable cutting insert 1, and a fastening screw can be passed through this opening in order to mount the indexable cutting insert 1 in a suitable cutting insert seat.

The transition from the side faces 5, 6 to the top 3 is formed by cutting edges 9, which are primary cutting edges in the region of the side faces 5, 6 and secondary cutting edges in the region of the rounded corners 7.

The structure of the side faces can be seen from FIG. 2. To make it possible to show the essential features of the invention, the scale in FIG. 2 is distorted compared with FIG. 1.

Here each side face 5 or 6 comprises a straight portion 11, which begins at the base 2 and at a sharp bend 12 changes into a transitional face 13. The transitional face 13 ends at a sharp bend 14, from which further face 15 extends as far as the cutting edge 9. The face 15 acts as the flank for the cutting edge 9.

As the drawing shows, the flank 15 is raised relative to an imaginary lengthening of the side face portion 11; in other words, the side faces 5, 6 contain a setback formed by the sharp bends 12, 14 and the transitional face 13, so that above the sharp bend 12 on the imaginary lengthening of the side face portion 11, as illustrated by a dashed line 16, a strip 17 is created.

The setback corresponding to the transitional face 13 extends approximately parallel to the cutting edge 9, and the width of the flank 15, which is designated by a double arrow 18 and extends from the cutting edge 9 to the sharp bend 14 where the setback begins, is approximately equivalent to the width of the wear mark on the flank of an indexable cutting insert made in accordance with the prior art, or in other words without the setback of a given quality of machining, the cutting and feeding forces, and the material used. Expressed in millimeters, this means a width of between 0.05 mm and 1 mm.

The depth of the setback, which is measured at the spacing between the sharp bend 14 and the straight line or face 16 that steadily extends the side face portion 11 at the sharp bend 12, which spacing is marked 19 in FIG. 2, is the result of the desired improvement in wear path and the strength to be preserved. The depth 19 of the setback may be between 0.02 and 0.4 mm.

The clearance angle of the flank 15, measured as an angle from the vertical on a plane defined by the base 2, is measured as in indexable cutting inserts of the prior art and depends on the field of use of the indexable cutting insert 1 and on the material to be machined in a chip-producing manner.

In FIG. 2, an indexable cutting insert 1 is shown in which the clearance angle is 0°; in other words, to attain a positive clearance angle, the indexable cutting insert 1 must be installed correspondingly negatively.

As FIG. 1, shows, while the setback there essentially follows the contour of the cutting edge 9, or in other words the flank 15 is of the same width all along strip 17, nevertheless it is also possible, in a departure from what is shown, to vary the width of the flank 15 along the cutting edge 9 and to provide a different width in the region of the side face 6, for instance, than in the region of the side face 5. Finally, the flank 15 need not necessarily be flat but instead the clearance angle of the flank 15 can also vary along the cutting edge 9, which is especially advantageous for use in shank-type or end milling cutters.

Finally, the possibility exists of forming the cutting edge 9 not as a straight edge but rather in a more or less curved fashion depending on the structure of the top 3. In this case as well, the strip 17 can be used.

The top 3 of the indexable cutting insert 1 is formed in a known manner, and a typical embodiment is shown merely by example in the drawings. Accordingly, a flat chamfer face 21 begins at the cutting edge 9 and merges at a distance of approximately 0.1 mm to 0.2 mm with a depression 22. The depression 22, in the direction toward the interior of the top 3, abut a flat plateau face 23, in which the through bore 8 is located. The chamfer face 21 together with the depression 22, in a known manner, form the chip face for shaping the chip.

The mode of operation of the novel flank geometry is described below in conjunction with FIG. 3.

If in use of the novel indexable cutting insert 1, as a consequence of the chip-removing machining, the cutting edge 9, which initially is as angular as possible except for a rounding toward the workpiece, is removed or worn down, the result is at first a contour as shown by the dashed line 24. The line of intersection between the face 24 and the chamfer face 21 is then the actual effective cutting edge 9', while on the lower end the face 24 produced by the abrasion merges with the original flank 15, specifically markedly above the sharp bend 14.

As wear continues, the face 24 migrates in the direction of the center of the indexable cutting insert 1. A further dot-dashed line 25 is intended to be a kind of snapshot of an insert geometry that then prevails. This dot-dashed line 25, which corresponds to the flank resulting from the wearing down, ends at its upper end approximately in the middle of the chamfer face 21 shown and extends downward to precisely the sharp bend 14. In other words, the wear mark represented by the dot-dashed line 25 has now attained approximately the size at which, in an indexable cutting insert of the prior art, the wear limit would be reached, since beyond that point the feeding force would rise too sharply, since the wear mark would rapidly progress farther in accordance with the inclination of the side face portion 11 or clearance angle of the original flank 15 in the case of a neutral insert. This is not true with the invention, however, because in it the setback begins from the sharp bend 14 onward, and thus the wear mark widens further only in accordance with the inclination of the transitional face 13 if wear shifts from the line 25 toward the center of the inside and hence in the direction of a dashed line 26. Although the face in engagement with the work piece, indicated by the line 26, has moved equally far away from the line 25 as would correspond to the distance between the line 24 and the line 25, the wear mark, which can be seen on the corresponding side wall 5, 6, has not become significantly wider compared with the status represented by the line 25, and hence the feeding force has also risen only correspondingly slightly.

Logically, the indexable cutting insert can now be worn down further, and the contact face between the indexable cutting insert 1 and the workpiece shifts as far as a dashed line 27, which at its lower end still always intersects the transitional face 13.

Figure 3:
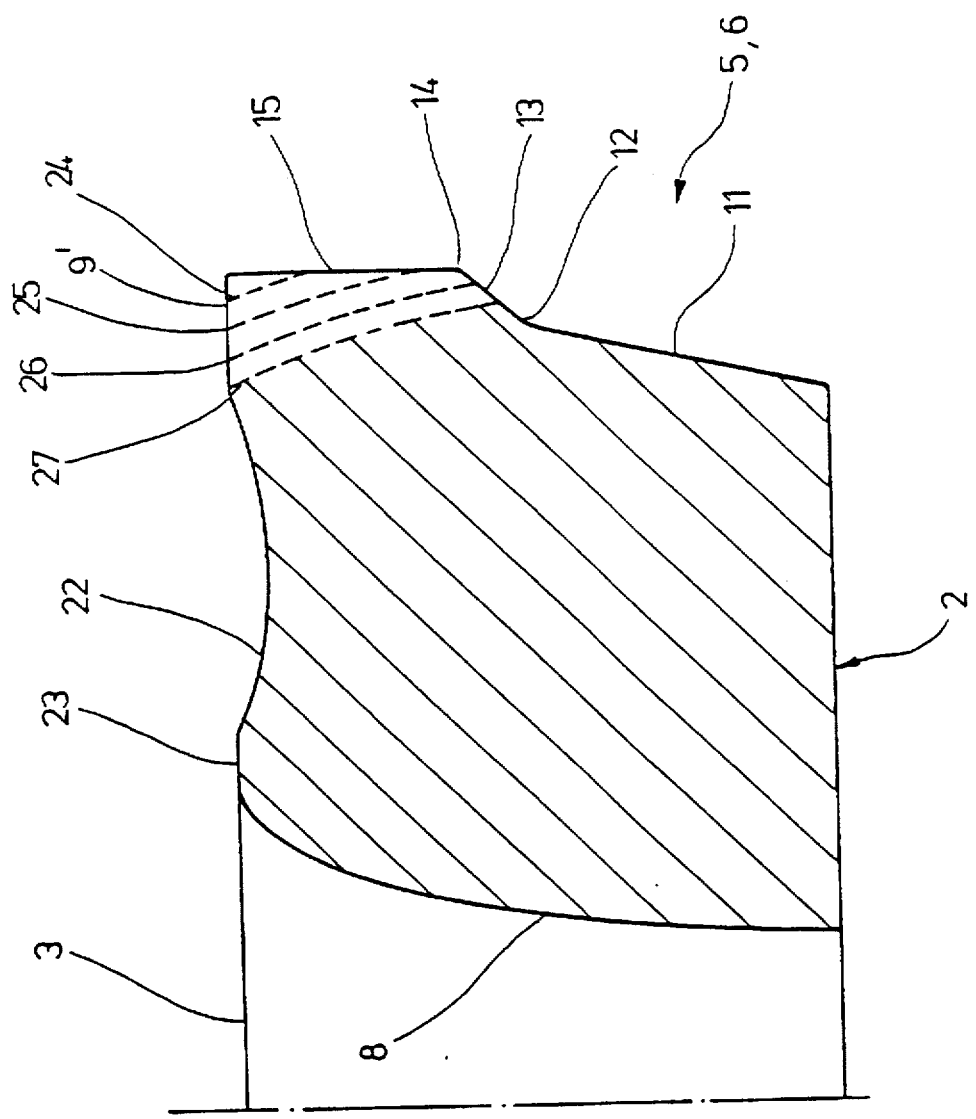
FIG. 3, the illustration of the indexable cutting insert of FIG. 2, showing the progressive wear in the region of the flank.

From the schematic view of FIG. 3 it can clearly be seen that in an indexable cutting insert of the prior art the service life is reached approximately once the indexable cutting insert has been worn down to the line 25. In the novel indexable cutting insert 1 provided with the reset and thus with the strip 17, conversely, a substantially longer service life and hence wear distance can be attained, because the indexable cutting insert 1 can easily be used beyond the wear mark corresponding to the line 25, since the width of the wear mark on the side face 5 or 6 still remains within the range intended by the user. Not until the wear of the indexable cutting insert has finally progressed so far that a face extending parallel to the line 27 and shifted still farther toward the interior of the indexable cutting insert 1 is created, which face merges at the sharp bend 12 with the side face portion 11, is the novel indexable cutting insert 1 used up, because from then on it would perform in the same way as an indexable cutting insert of the prior art would once a wear represented by the line 25 had occurred.

The inclination of the transitional face 13 relative to a vertical to the base 2 should be chosen to be as close as possible to 90° in accordance with the invention. Since such transitional faces are difficult to produce, however, in the case of sintered hard metal indexable cutting insert, it is advantageous if the transitional face 13 extends not parallel to the base 2 but rather inclined at an angle, so as to avoid transitions vulnerable to chipping at the sharp bend points 12 and 14.

The depth 19 of the setback, conversely, depends solely on the breaking strength needed. The farther the strip 17 overhangs, the greater the lengthening of the wear distance of the novel indexable cutting insert 1 self-evidently is compared with an indexable cutting insert of the prior art. However, this is sometimes at the cost of a reduction in breaking strength in the region of the cutting edge 9 and therefore the overhang and thus the depth 19 of the strip 17 must be reduced accordingly.

Although in FIG. 2 the illustration is chosen such that the lengthening 16 of the side face portion 11 extends through the cutting edge 9 of the virgin indexable cutting insert 1, this condition need not be met in order to attain the above-described advantages. It depends on the other seat conditions for the indexable cutting insert 1 whether the lengthening 16 extends past the cutting edge 9 on the left or right, in terms of FIG. 2.

Figure 4:
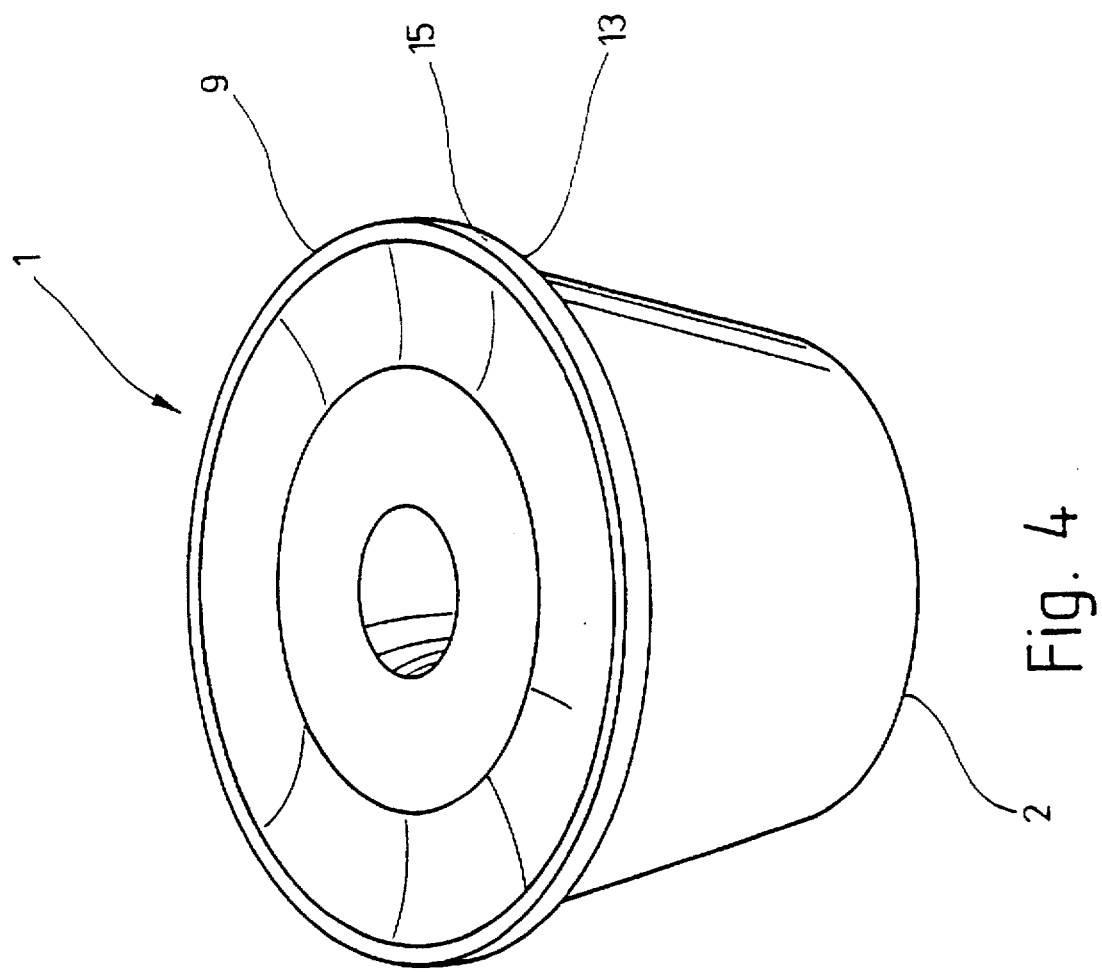
FIG. 4, a round indexable cutting insert according to the invention, in a perspective view.

The side face geometry according to the invention, as FIG. 4 shows, can also be employed with frustoconical round indexable cutting inserts 1. Here the flank 15, defined by the setback in accordance with the transitional face 13, extends parallel to the cutting edge 9 around the entire circumference of the indexable cutting insert 1. The side wall structure is otherwise formed in the same way as the side wall structure of FIGS. 1-3.

Figure 5:
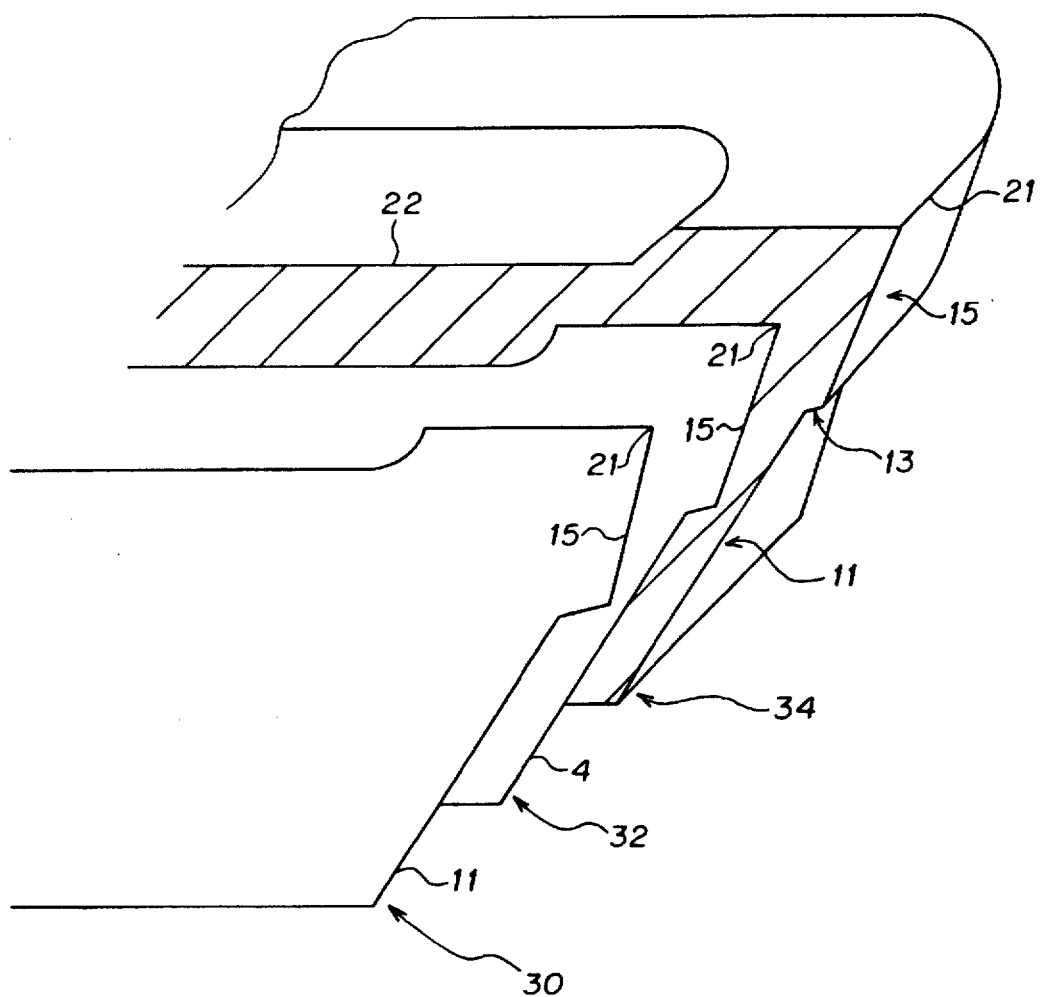
FIG. 5, an expanded perspective view of three sections taken perpendicularly to one of the straight cutting edges and spaced along that cutting edge.

FIG. 5 depicts how the clearance angle of the flank 15 can vary continuously or discontinuously along the cutting edge. In particular, each of sections 30, 32 and 34 shows a different clearance angle for its respective flank 15. The change from one such clearance angle, such as in section 30, to another clearance angle, such as in section 32, can be discontinuous in that the change occurs abruptly, for example, at section 32. On the other hand, the change can also vary continuously by way of a curvature between these two sections 30 and 32.

We claim:

1. An indexable cutting insert (1), which is substantially in the form of a truncated cone or truncated pyramid, comprising:
    a substantially flat base (2),
    a flat or structured top (3) spaced apart from the base (2),
    a side wall arrangement (4) extending between the base (2) and the top (3), which side wall arrangement, together with the top (3), forms a cutting edge (9) at least in a portion extending along the intersection of the side wall arrangement (4) and the top (3), and
    a setback (13), contained at least in the portion of the side wall arrangement (4) adjoining the top (3), which setback at least approximately follows a course of the cutting edge (9) and, beginning at the cutting edge (9), forms a strip (17) that at least approximately follows a contour of the cutting edge (9), which strip is raised in this portion compared with a region (11) of the side wall arrangement (4) extending in a direction toward the base (2), and a face (15) of said strip, forms a flank of the cutting insert (1).

2. The cutting insert of claim 1, characterized in that the setback (13) extends substantially parallel to the cutting edge (9).

3. The cutting insert of claim 1, characterized in that the setback has a transitional face (13) which connects the flank with the region (11) of the side wall arrangement (4) adjoining the base (2), and that the transitional face (13) extends approximately parallel to the base (2).

4. The cutting insert of claim 1, characterized in that the setback has a transitional face (13) which connects the flank with the region (11) of the side wall arrangement (4) adjoining the base (2), and that the transitional face (13) extends in an inclined fashion relative to the base (2).

5. The cutting insert of claim 1, characterized in that the setback has a transitional face (13) which connects the flank with the region (11) of the side wall arrangement (4) adjoining the base (2), and that the transitional face (13) is not straight.

6. The cutting insert of claim 1, wherein a wear mark is formed when a cutting edge operatively engages a workpiece, and an allowable wear mark is the maximum wear on the cutting insert before it is replaced, characterized in that the width of the flank, measured at right angles to the cutting edge (9), is approximately equivalent to the size of the allowable wear mark, measured in the same direction.

7. The cutting insert of claim 6, characterized in that the width of the flank is between 0.05 mm and 1.0 mm.

8. The cutting insert of claim 1, characterized in that the depth of the setback (13) is at least as large as the offset of the cutting edge (9) occurring at the end of its service life, measured on the top of a cutting insert formed without the setback (13).

9. The cutting insert of claim 8, characterized in that the depth of the setback (13) is between 0.02 mm and 0.4 mm.

10. The cutting insert of claim 1, characterized in that the strip (17) extends at least substantially all the way around the cutting insert along the side wall arrangement (4).

11. The cutting insert of claim 1, characterized in that it is a triangular or polygonal cutting insert, on the secondary cutting edges of which corners are formed, and that the setback (13) that defines a strip (17) is formed on the secondary cutting edges as well.

12. The cutting insert of claim 1, characterized in that the angle that the face (15) forms with the base (2) is closer to 90° than the angle that the side wall arrangement (4), in the portion between the setback (13) and the base (2) forms with the base (2), and is thus greater than the angle measured between the base (2) and the surface region located between the base (2) and the setback (13).

13. The cutting insert of claim 1, characterized in that the clearance angle of the face (15) of the strip (17) is 0°.

14. The cutting insert of claim 1, characterized in that the clearance angle of the face (15) of the strip (17) is greater than 0°.

15. The cutting insert of claim 1, characterized in that the clearance angle of the face (15) of the strip (17) is negative.

16. An indexable cutting insert (1), comprising:

a body which is substantially in the form of a truncated cone or truncated pyramid, said body having a substantially flat base (2), a flat or structured top (3) spaced apart from the base (2), a side wall arrangement (4) and at least one cutting edge (9), a setback (13) on the side wall arrangement (4) which at least approximately follows a course of the cutting edge (9) and forms a raised strip (17) that begins at the cutting edge (9) and has a flank (15), wherein a width (18) of the flank (15), measured in a direction perpendicular to the cutting edge (9), is approximately equivalent to a size of an allowable wear mark of the flank (15), measured in the same direction; the setback has a depth (19), which is between 0.02 mm and 0.4 mm; and a clearance angle is smaller than an angle between a line perpendicular to the base and the side wall arrangement (4).

17. The indexable cutting insert of claim 16, wherein the setback (13) extends substantially parallel to the cutting edge (9).

18. The indexable cutting insert of claim 16, wherein the setback has a transitional face which connects the flank (15) with a region (11) of the side wall arrangement (4) adjoining the base (2), and the transitional face extends approximately parallel to the base (2).

19. The indexable cutting insert of claim 16, wherein the setback has a transitional face which connects the flank (15) with a region (11) of the side wall arrangement (4) adjoining the base (2), the transitional face is straight or convex or concave in cross section, and the transitional face extends in an inclined direction relative to the base (2).

20. The indexable cutting insert of claim 16, wherein the width of the flank (15) is between 0.05 mm and 1.0 mm.

21. The indexable cutting insert of claim 16, wherein the strip (17) extends substantially all the way around the indexable cutting insert along the side wall arrangement (4).

22. The indexable cutting insert of claim 16, wherein said body is shaped as a polygon, on the secondary cutting edges of which corners are formed, and the setback (13) that defines the strip (17) is attached on at least one of the secondary cutting edges.

23. The indexable cutting insert of claim 16, wherein the clearance angle of the flank (15) of the strip (17) is 0°, or greater than 0°, or is negative.

24. The indexable cutting insert of claim 16, wherein the angle measured between the base (2) and the side wall arrangement (4) is larger along the cutting edge.

25. The indexable cutting insert of claim 16, wherein the clearance angle of the rake varies continuously or discontinuously along the cutting edge.

26. The indexable cutting insert of claim 16, wherein the angle measured between the base (2) and the side wall arrangement (4) is smaller along the cutting edge.

27. The cutting insert of claim 1, characterized in that the clearance angle of the flank varies continuously or discontinuously along the cutting edge.

* * * * *